United States Patent [19]

Schoepe

[11] 4,080,986

[45] Mar. 28, 1978

[54] BALL COCK FLOAT HAVING IMPROVED ANTI-NOISE STRUCTURE

[76] Inventor: Adolf Schoepe, 1620 N. Raymond Ave., Fullerton, Calif. 92631

[21] Appl. No.: 706,460

[22] Filed: Jul. 19, 1976

[51] Int. Cl. .................................................. F16k 31/24
[52] U.S. Cl. ........................................ 137/432; 4/366; 4/395; 73/322.5; 137/426; 137/434
[58] Field of Search ................. D23/33, 40; 73/322.5; 4/18 A, 41, 56; 137/429, 414, 430, 432, 433, 434, 442, 444

[56] References Cited

U.S. PATENT DOCUMENTS

| 2,394,437 | 2/1946 | Freeman | 73/322.5 |
|---|---|---|---|
| 3,144,874 | 8/1964 | Goldtrap | 137/414 |
| 3,428,078 | 2/1969 | Christopher | 73/322.5 |
| 3,554,219 | 1/1971 | Hudson | 137/414 |
| 3,584,644 | 6/1971 | Morken | 137/432 |
| 3,865,131 | 2/1975 | Jacobson | 137/451 |
| 3,916,454 | 11/1975 | Schoepe et al. | 137/434 |

*Primary Examiner*—Martin P. Schwadron
*Assistant Examiner*—G. L. Walton
*Attorney, Agent, or Firm*—Mahoney, Schick & Cislo

[57] ABSTRACT

An essentially closed hollow body of the float receives liquid in a lower portion for ballast and air in an upper portion for floatation with a vertical guide sleeve therethrough being offset at one side of the hollow interior slightly spaced inwardly of a part of the body sidewall. A liquid and air flow opening is formed through the body sidewall part horizontally centered relative to the guide sleeve so that flow paths are created segregated approximately one half around either side of the guide sleeve. By arcuately forming the body interior and the guide sleeve, not only are the flow paths smoothly arcuate, but the circuitous nature thereof muffles echoing sounds created within the hollow body from passing outwardly of the body through the flow opening.

14 Claims, 6 Drawing Figures

U.S. Patent   March 28, 1978   Sheet 1 of 2   4,080,986
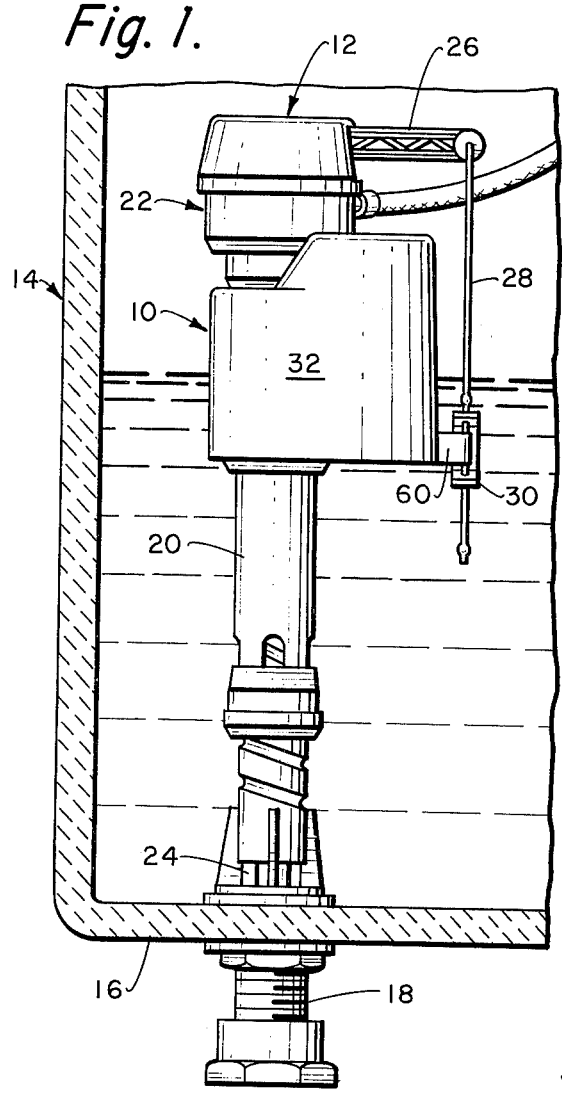
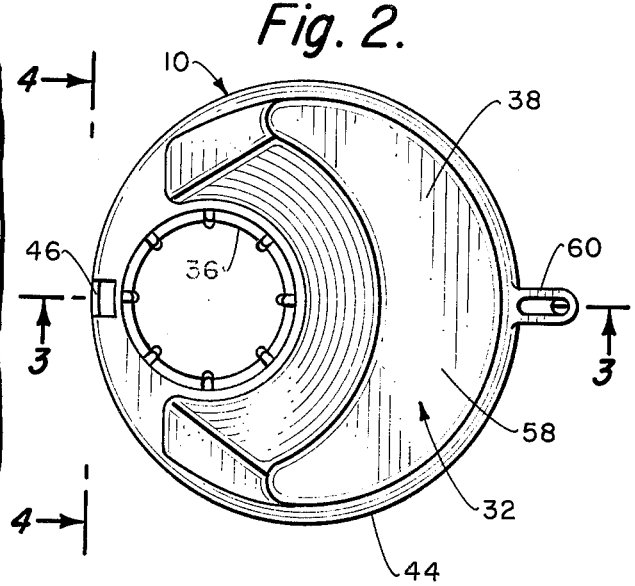
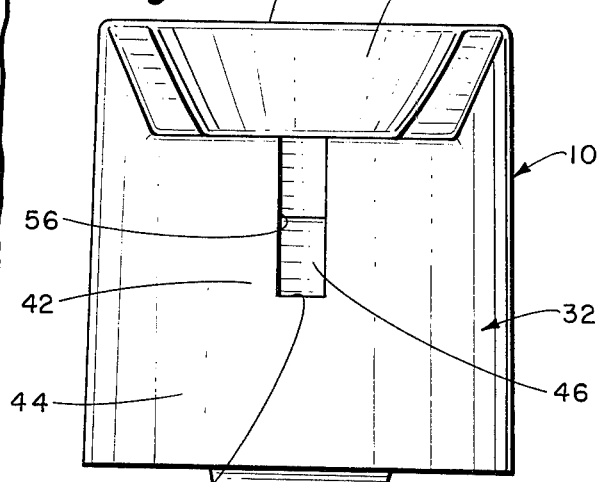
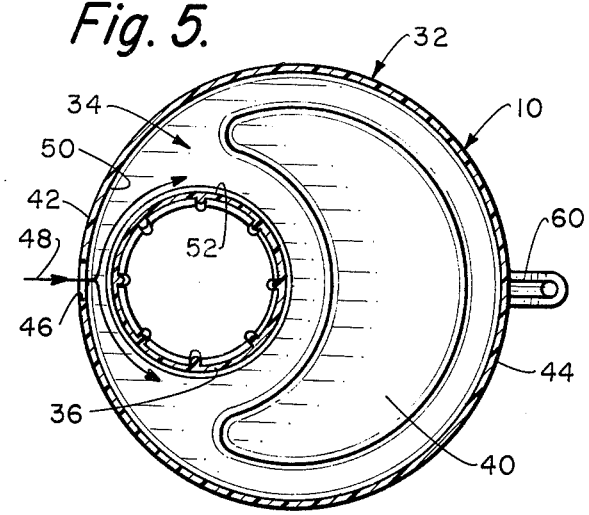
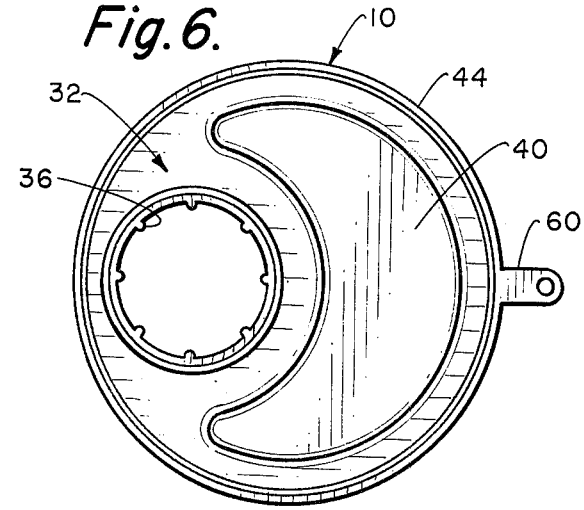

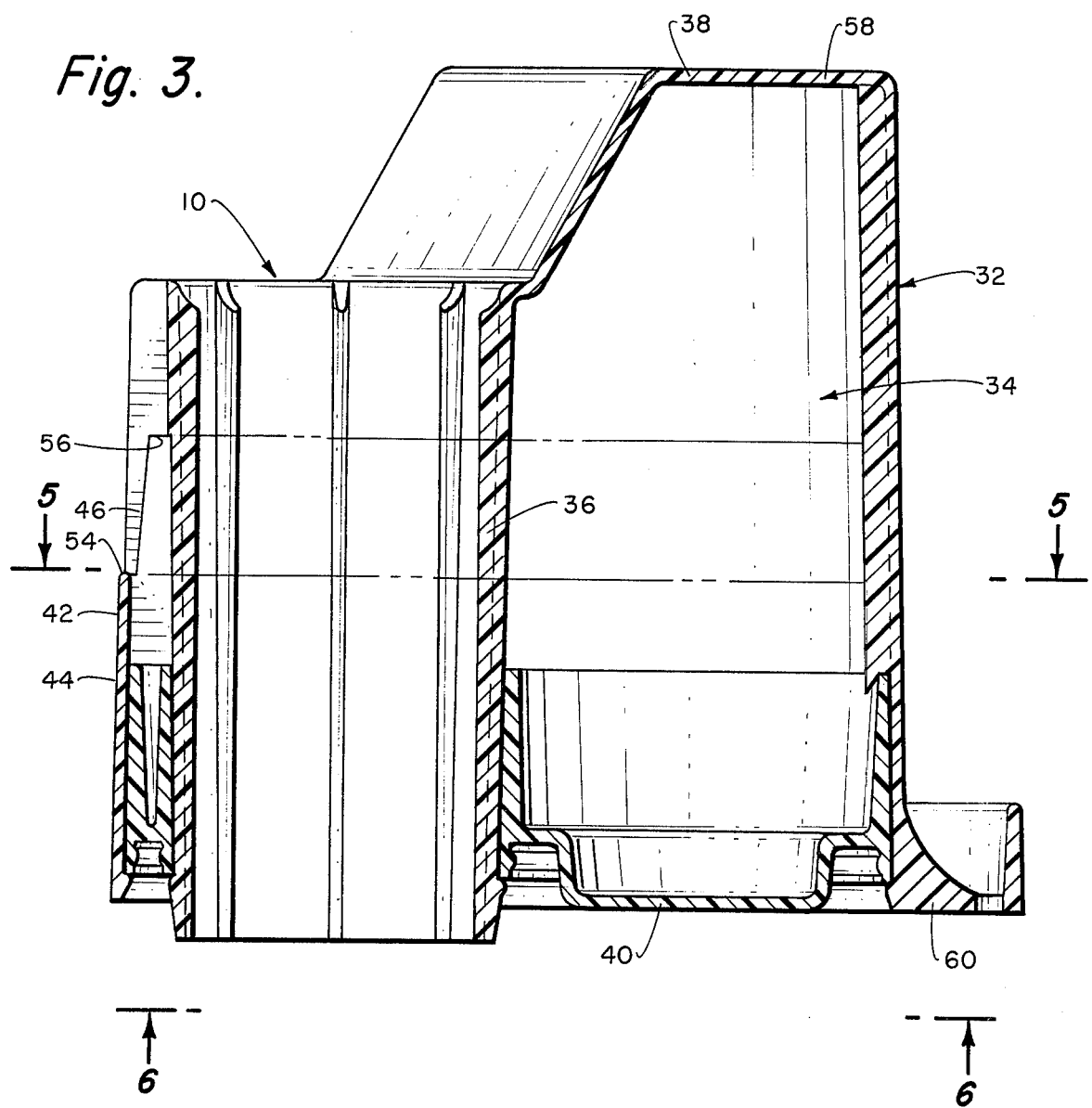

4,080,986

BALL COCK FLOAT HAVING IMPROVED ANTI-NOISE STRUCTURE

BACKGROUND OF THE INVENTION

This invention relates to a float of the type for use with ball cocks and the like in controlling the liquid level in tanks, and more particularly, to such a float having an essentially closed, hollow interior making use of liquid in the lower portion thereof for ballast and air in the upper portion thereof for floatation. By horizontally offsetting a vertical guide therethrough to one side inwardly of the hollow interior and providing a liquid, and preferably air, flow opening through a sidewall thereof horizontally centered relative to the guide, a bifurcated flow path is established into and from the interior approximately one half at either side of the guide with the remainder of the interior. It has been found that with these restricted flow paths and the float interior otherwise closed off, the float tends to muffle usual echoing sounds created within the float hollow interior as transmitted thereto from other parts of the ball cock greatly inhibiting their passing outwardly of the hollow interior.

Various forms of floats have been heretofore provided for use with ball cocks and the like in controlling the liquid level in tanks, for instance, floats for ball cocks controlling the water level in toilet flush tanks. Of more modern advent is the use of floats of this character which are usually formed totally of plastic and have essentially closed, hollow interiors with the lower part of the hollow interior receiving liquid therein for ballast and the upper part of the hollow interior receiving air therein for floatation. Combined liquid and air flow openings are usually formed through the float sidewalls in one manner or another for appropriate circulation of the liquid and air to and from the float hollow interiors.

Although these plastic, hollow floats, if properly constructed, are efficiently operable serving their intended purpose, one of the basic difficulties and disadvantages thereof is that of noise. Various noises generated from adjacent parts of the ball cock are transmitted into or otherwise received within the float hollow interiors, an appreciable portion of these float interiors always being filled solely with air, which causes noise echoing from internally of the floats which is transmitted and otherwise broadcast outwardly through the sidewall flow openings into the surrounding environment. Obviously, this noise creation is particularly critical where the floats are used with ball cocks installed in toilets of homes. Not only are such noises objectionable purely from the aesthetic standpoint, particularly in homes, but are even more objectionable when emanating from bathrooms in homes directly adjacent sleeping quarters due to the night disturbances created thereby.

OBJECTS AND SUMMARY OF THE INVENTION

It is, therefore, an object of this invention to provide a float of the type for use with ball cocks and the like in controlling the liquid level in tanks wherein, due to the construction of the float incorporating the unique principles of the present invention, noise creation and transmission is greatly decreased despite the fact that the float is of the more recent essentially closed, hollow interior type. According to the present invention, a hollow float body has a vertical guide therethrough interrupting the hollow interior at a horizontally offset position spaced slightly inwardly of an adjacent part of a body sidewall. A flow opening is formed through the body sidewall part horizontally centered relative to the guide to provide a bifurcated flow path through the flow opening approximately one half around each side of the guide and with the remainder of the body interior. The overall result is a circuitous and separated outwardly open path to and from the body interior which causes muffling of interiorly echoing noises which normally would be transmitted and broadcast outwardly through the flow opening.

In a specific, preferred embodiment form of the float principles of the present invention, the float guide may be a sleeve which is generally circular in horizontal cross-section presenting arcuate surfaces to the interior of the float. Furthermore, the float interior surfaces horizontally adjacent the guide sleeve may likewise be arcuate in configuration. Thus, the flow channels within the float interior are smoothly, arcuately sided so as to further inhibit noise creation and transmission.

Other objects and advantages of the invention will be apparent from the following specification and the accompanying drawings which are for the purpose of illustration only.

BRIEF DESCRIPTION OF THE DRAWINGS

FIG. 1 is a fragmentary, vertical sectional view of a toilet flush tank having a ball cock installed therein for controlling the water level thereof, the ball cock making use of a float incorporating a preferred embodiment of the principles of the present invention;

FIG. 2 is an enlarged, top plan view of the float of FIG. 1 removed from the assembly of FIG. 1;

FIG. 3 is an enlarged, vertical sectional view looking in the direction of the arrows 3—3 in FIG. 2;

FIG. 4 is a side elevational view looking in the direction of the arrows 4—4 in FIG. 2;

FIG. 5 is a reduced, horizontal sectional view looking in the direction of the arrows 5—5 in FIG. 3; and FIG. 6 is a reduced, bottom plan view looking in the direction of the arrows 6—6 in FIG. 3.

DESCRIPTION OF THE BEST EMBODIMENT CONTEMPLATED

Referring to FIG. 1 of the drawings, a ball cock float generally indicated at 10 incorporating a preferred embodiment of the principles of the present invention is shown operably installed on a ball cock generally indicated at 12, the assembly being, in turn, operably mounted within a typical liquid, in this case water, toilet flush tank generally indicated at 14 for controlling the water level therein. The ball cock 12 and the flush tank 14 merely form background environment for the preferred embodiment float 10 of the present invention, the ball cock being mounted on a bottom wall 16 of the flush tank receiving a supply of water under pressure therethrough within a ball cock inlet tube 18 which is telescoped by a ball cock outlet tube 20 within the confines of the flush tank. A water controlling valve generally indicated at 22 is mounted at the upper ends of the inlet and outlet tubes 18 and 20 receiving the water from the inlet tube and when in open position, directing the same downwardly around the outer side of the inlet tube within the outlet tube 20, ultimately exhausting the same into the flush tank 14 through the outlet openings 24.

The ball cock valve 22 is moved between open position directing water flow into the flush tank 14 as described and closed position interrupting such water flow by a generally horizontal operating lever 26 having an outer end pivotally connected through a connecting tank 28 and a positioning clip 30 to the float 10. Still generally, this particular embodiment of the float 10 vertically slidably telescopes the outlet tube 20 of the ball cock 12 underlying the ball cock valve 22. Furthermore, the float 10 is of the hollow construction type making use of a particular level of liquid, in this case water, in the lower internal portion thereof for the necessary ballast and air in the upper internal portion thereof for the necessary floatation.

More particularly to the unique float principles of the present invention, the float 10 includes a preferably two-piece, molded plastic, generally upright cylindrical body generally indicated at 32 which is essentially closed, hollow creating a hollow interior generally indicated at 34. A vertical guide for the float 10, in this case, a preferably generally cylindrical guide sleeve 36 is positioned horizontally interrupting the hollow interior 34 vertically between a body top wall 38 and a body bottom wall 40. As shown and most important to the principles of the present invention, the guide sleeve 36 is horizontally offset to one side within the hollow interior 34 of the body 32 so as to be positioned spaced horizontally inwardly only a proportionately small distance from a part 42 of a generally cylindrical body sidewall 44.

Also important to the principles of the present invention, a preferably vertically oblong or rectangular flow opening 46 is formed through the part 42 of the sidewall 44 into the body hollow interior 34 intermediate the vertical height of the sidewall. This flow opening 46 is horizontally centered relative to the guide sleeve 36 and is of not greater horizontal width than the guide sleeve, preferably of a horizontal width far less than that of the guide sleeve. Thus, as can be best seen in FIG. 5, a flow path 48 is established through the body flow opening 46 which is directly horizontally obstructed by the guide sleeve 36 so as to be bifurcated or separated immediately within the body hollow interior 34, approximately one half of the flow path flowing around each side of the guide sleeve 36 to and from the remainder of the hollow interior 34. Furthermore, this separated flow path 48 within the body hollow interior 34 is defined or sided by arcuate flow surfaces forming arcuately sided flow directing slots due to arcuate interior surfaces 50 of the sidewall 44 and arcuate outer surfaces 52 of the guide sleeve 36.

As is frequently the case in liquid or water ballast and air floatation floats of this general type, the flow opening 46 serves for both water and air flow to and from the hollow interior 34. The minimum water level within the hollow interior 34 is determined by a lower edge 54 of the flow opening 46 and the lower limit of the air contained within the hollow interior is determined by upper edges 56 of the flow opening, all as best seen in FIG. 3. With these preset limits, the proper water ballast will be maintained within the hollow interior 34 and the proper air floatation will be maintained therein for the exact predicated operation of the ball cock valve 22 in a manner to be hereinafter briefly described.

With ball cocks of this general liquid or water ballast and air floatation type making use of a hollow float body, it is known that with the prior constructions generally having the upper portion of the float interiors merely containing air that ball cock operating noises, as well as any other exterior noises received therein, will echo within the float interior and will be readily discernible and will be broadcast through the normal float flow opening or openings and outwardly thereof. With the improvements of the present invention, however, wherein the flow path 48 through the flow opening 46 and into the remainder of the hollow interior 34 of the body 32 is obstructed and thereby separated around the guide sleeve 36, these internal noises are greatly muffled and are far less discernible from exterior of the float 10. In addition, according to the preferred embodiment of the present invention, the fact that not only is the flow path 48 thusly separated and caused to travel in circuitous paths around the guide sleeve 36, but in such travel, each of the separated flow paths is relatively smoothly arcuate as determined by the arcuate interior and outer surfaces 50 and 52 within and outwardly around the body sidewall 44 and the guide sleeve 36, again tending to diminish sound transmission outwardly of the float while still providing efficient flow characteristics.

Completing the exact particulars of the preferred embodiment of the float 10, as best seen in FIG. 3, the top and sidewalls 38 and 44 of the body 32 and the guide sleeve 36 are preferably molded of one piece and downwardly telescope the bottom wall 40 of the body which is also formed of one piece thereby very simply completing the assembly of the float 10 closing the hollow interior 34 thereof except for the flow opening 46. Furthermore, the top wall 38 of the body 32 is preferably molded with a partially arcuate and raised portion 58 which provides increased internal volume within the hollow interior 34 of the body 32 for air containment and, therefore, buoyancy, again as internally shown in FIG. 3 and exteriorly in FIGS. 2 and 4. At the same time, this top wall raised portion 58 provides clearance for nesting of the float 10 upwardly around the valve 22 of the ball cock 12 when the float is in raised position resulting in aesthetically pleasing and operating compactness for the overall float and ball cock assembly as shown in FIG. 1. Finally, a boss 60 is molded as an integral part of the body sidewall 44 preserving the body two-piece molded construction, the boss being for the usual purpose of connection of the ball cock connecting link 28 thereto operably connecting the float 10 to the ball cock 12 in the usual manner.

Briefly as to the overall operation of the assembled float 10 and ball cock 12 for controlling the water level in the flush tank 14, assume that the flush tank has the water level therein at the maximum level for the particular relative vertical setting between the float and ball cock as shown in FIG. 1, the float will be maintaining the valve operating lever 26 at its upwardly pivoted position to, in turn, maintain the valve 22 in closed position. At this stage, the water level within the float hollow interior 34 will be maintained at a level generally determined by the upper edge 56 of the flow opening 46, the remainder of the float hollow interior 34 having air trapped therein due to the float flow opening 46 being sealed off by the water.

When the water level within the flush tank 14 is lowered by draining the water therefrom through the usual outlet valve (not shown) in the bottom wall 16 of the flush tank 14, the water ballast within the float hollow interior 34, although initially draining therefrom to the lower edge 54 of the flow opening 46, will cause the float 10 to slide vertically downwardly along the ball cock outlet tube 20, thereby downwardly pivoting the ball cock operating lever 26 and opening the ball cock valve 22. Water will then immediately begin to flow upwardly through the ball cock inlet tube 18, to the ball cock valve, downwardly through the ball cock outlet tube and into the flush tank 14 through the ball cock outlet openings 24 beginning to again refill the flush tank. As the vertically raising water within the flush tank begins to encompass the lower portion of the float 10 at the float lower vertical position determined by its connection to and downward pivoting of the valve operating lever 26 of the ball cock 12, this water will ultimately additionally fill the float hollow interior 34 from the flow opening lower edge 54 while the float 10 remains stationary up to the upper edges 56 of the float flow openings 46, at which time, the air again trapped within the float hollow interior will begin to have a buoyancy effect beginning to vertically raise the float along the ball cock outlet tube 20.

Immediately, the buoyancy effect of the float 10 caused by the air trapped therein will move the float vertically upwardly along the ball cock outlet tube 20 toward the ball cock valve 22 closed position. Thus, the float 10 will thereby have its water ballast and air buoyancy within the hollow interior 34 automatically provided by the positioning of the float flow opening 46 and will ultimately move vertically upwardly to maximum vertical position closing the ball cock valve 22 and the flush tank supply water inward flow again to the position shown in FIG. 1. In the usual manner, slight adjustments may be made in the upper water level of the flush tank 14 by selective adjustment of the relative vertical positioning between the float 10 and ball cock 12 through the usual slight adjustment of the positioning clip 30 along the connecting link 28.

According to the principles of the present invention, therefore, a ball cock float 10 is provided of the essentially closed hollow interior type making use of liquid or water ballast and air floatation for functioning thereof, yet through unique formation and positioning of certain of the float elements, noise echoing, transmission and broadcasting therefrom is greatly decreased during a still efficient functioning thereof. By particularly positioning of the float body flow opening 46 relative to the float guide, preferably the guide sleeve 36, the normal functioning liquid and air flow passages to and from the hollow interior 34 are separated and caused to extend circuitously in a particularly preplanned manner which still maintains efficient flow paths while tending to muffle sounds echoing and normally emanating from the hollow interior of floats of this character. The overall result is vastly diminished noise levels improving the ecology of the surrounding environment.

I claim:

1. In a float of the type for use with ball cocks and the like in controlling the liquid level in tanks, the combination of: a hollow body having top, bottom and sidewalls; a float guide extending vertically through an interior of said body between said top and bottom walls horizontally interrupting and surrounded by said body interior, said guide being horizontally offset in said body and spaced a proportionately short distance from a part of said body sidewall; a fluid flow opening formed through said body sidewall part communicating into said body interior horizontally centered directly horizontally of said guide and of not greater horizontal width than said guide so that a flow path through said fluid flow opening is generally horizontally aligned with and is separated horizontally approximately one half to each side of said guide into and from a remainder of said body interior.

2. In a float as defined in claim 1 in which said fluid flow opening in said body sidewall part is vertically oblong and of less horizontal width than said guide.

3. In a float as defined in claim 1 in which said guide is generally circular in horizontal cross-section presenting arcuate flow directing surfaces horizontally around said guide into said body interior.

4. In a float as defined in claim 1 in which said body interior is generally arcuate in horizontal cross-section at vertical location of said fluid flow opening presenting arcuate body interior flow directing surfaces horizontally around sides of said guide.

5. In a float as defined in claim 1 in which said guide is generally arcuate in horizontal cross-section and said body interior is generally circular in horizontal cross-section at vertical location of said fluid flow opening presenting arcuately sided flow directing slots in said body interior between said body and said guide horizontally around said guide sides.

6. In a float as defined in claim 1 in which said guide is generally circular in horizontal cross-section and said body interior is generally arcuate in horizontal cross-section at vertical location of said fluid flow opening presenting arcuately sided flow directing slots in said body interior between said body and said guide horizontally around said guide sides; and in which said fluid flow opening in said body sidewall part is a vertically oblong opening for less horizontal width than said guide.

7. In a float as defined in claim 1 in which said guide is generally circular in horizontal cross-section and said body interior is generally arcuate in horizontal cross-section at vertical location of said fluid flow opening presenting arcuately sided flow directing slots in said body interior between said body and said guide horizontally around said guide sides; and in which said fluid flow opening in said body sidewall part is a vertically oblong opening of less horizontal width than said guide, said opening being the only opening through said body sidewall into said body interior thereby serving as both a liquid and air flow opening.

8. In a method of reducing noise emanating from a float for use with ball cocks and the like in controlling the liquid level in tanks, the steps of: positioning a vertical float guide horizontally interrupting a generally closed hollow interior of a float body; during said guide positioning, horizontally offsetting said guide in said body interior spaced a relatively short horizontal distance from an adjacent part of a body sidewall; during use of said float, flowing fluid into and from said body closed interior through said adjacent sidewall part in a fluid flow path not substantially greater in horizontal width than said guide and generally horizontally aligned with said guide resulting in said fluid flow being separated horizontally approximately one half to either side of said guide and then into a remainder of said body closed interior.

9. In a method as defined in claim 8 in which said method includes the step of forming said vertical float guide generally circular in horizontal cross-section presenting arcuate flow directing surfaces horizontally around said guide interiorly of said body for said fluid flow path.

10. In a method as defined in claim 8 in which said method includes the step of forming surfaces of said body interior adjacent said guide horizontally arcuate presenting arcuate body interior flow directing surfaces around sides of said guide for said fluid flow path.

11. In a method as defined in claim 8 in which said method includes the step of forming arcuately sided flow slots between said body and said guide presenting horizontally arcuate flow surfaces interiorly of said body horizontally around said guide sides for said fluid flow path.

12. In a method as defined in claim 8 in which said step of flowing fluid into and from said body closed interior includes restricting said flow path horizontally to less than width of said guide at said body adjacent sidewall part and generally horizontally aligned with said guide.

13. In a method as defined in claim 8 in which said method includes the step of forming arcuately sided flow slots between said body and said guide presenting horizontally arcuate flow surfaces interiorly of said body horizontally around said guide sides for said fluid flow path; and in which said step of flowing fluid into and from said body closed interior includes restricting said flow path horizontally to less than width of said guide at said body adjacent sidewall part and generally horizontally aligned with said guide.

14. In a method as defined in claim 8 in which said method includes the step of forming arcuately sided flow slots between the body and said guide presenting horizontally arcuate flow surfaces interiorly of said body horizontally around said guide sides; for said fluid flow path; and in which said step of flowing fluid into and from said body closed interior includes restricting said flow path horizontally to less than width of said guide at said body adjacent sidewall part and generally horizontally aligned with said guide, flowing both liquid and air into and from said body closed interior in said fluid flow path through a single flow opening at said adjacent sidewall part.

* * * * *